(12) United States Patent
Raghu

(10) Patent No.: US 9,459,623 B1
(45) Date of Patent: Oct. 4, 2016

(54) STOP SIGN INTERSECTION DECISION SYSTEM

(71) Applicant: VOLKSWAGEN AG, Wolfsburg (DE)

(72) Inventor: Kaushik Raghu, Redwood City, CA (US)

(73) Assignee: VOLKSWAGEN AG, Wolfsburg (DE)

( * ) Notice: Subject to any disclaimer, the term of this patent is extended or adjusted under 35 U.S.C. 154(b) by 0 days.

(21) Appl. No.: 14/699,379

(22) Filed: Apr. 29, 2015

(51) Int. Cl.
  G05D 1/00 (2006.01)
  G01C 21/26 (2006.01)
  G05D 1/02 (2006.01)
  G01S 13/93 (2006.01)

(52) U.S. Cl.
  CPC ............. *G05D 1/0088* (2013.01); *G01C 21/26* (2013.01); *G01S 13/931* (2013.01); *G05D 1/0231* (2013.01); *G05D 2201/0213* (2013.01)

(58) Field of Classification Search
  USPC .......................................................... 701/27
  See application file for complete search history.

(56) References Cited

U.S. PATENT DOCUMENTS

| | | | |
|---|---|---|---|
| 8,195,394 B1 | 6/2012 | Zhu et al. | |
| 8,571,743 B1 | 10/2013 | Cullinane | |
| 8,676,500 B1 | 3/2014 | Walsh | |
| 8,694,192 B2 | 4/2014 | Cullinane | |
| 8,874,372 B1 | 10/2014 | Zhu et al. | |
| 2008/0162027 A1* | 7/2008 | Murphy | B60W 50/14 701/117 |
| 2009/0109061 A1* | 4/2009 | McNew | G08G 1/164 340/928 |
| 2012/0206483 A1* | 8/2012 | Funabashi | G08G 1/096716 345/629 |
| 2015/0134180 A1* | 5/2015 | An | G01C 21/34 701/23 |

\* cited by examiner

*Primary Examiner* — Anne M Antonucci
(74) *Attorney, Agent, or Firm* — Barnes & Thornburg LLP

(57) ABSTRACT

An intersection decision system for autonomously navigating an autonomous vehicle through a stop sign intersection. The intersection decision system includes an intersection arrival detector configured to automatically detect that the vehicle has arrived at the stop sign intersection, a vehicle detector for automatically detecting previously-arrived vehicles at the stop sign intersection, and a pedestrian detector for automatically detecting pedestrians crossing at the stop sign intersection. The intersection decision system determines whether the detected pedestrians are obstructing the previously-arrived vehicles from proceeding through the stop sign intersection. If so, the intersection decision system determines that the autonomous vehicle should proceed through the stop sign intersection without waiting for the previously-arrived vehicles to proceed through the stop sign intersection.

11 Claims, 4 Drawing Sheets

STOP SIGN INTERSECTION DECISION SYSTEM

BACKGROUND

The present disclosure relates to systems, components, and methodologies for autonomously navigating a vehicle. In particular, the present disclosure relates to systems, components, and methodologies for autonomously navigating a vehicle through intersections.

SUMMARY

According to the present disclosure, systems, components, and methodologies are provided for autonomously navigating a vehicle through intersections.

In illustrative embodiments, an in-vehicle intersection decision system determines when an autonomous vehicle should proceed through intersections in which right of way is governed by stop signs. The intersection decision system receives an indication of when the autonomous vehicle arrives at a stop sign intersection, detects vehicles that have previously arrived at the stop sign intersection, and detects obstructions that may prevent the previously-arrived vehicles from promptly proceeding through the stop sign intersection. The intersection decision system determines when the autonomous vehicle should proceed through the intersection based not only on the order in which vehicles arrived at the intersection, but also based on whether vehicles ordinarily having priority are being obstructed.

Where no obstructions prevent a previously-arrived vehicle from proceeding through the intersection, the intersection decision system may operate in accordance with a "first-in first-out" implementation. Thus, the intersection decision system waits to detect that the previously-arrived vehicle has proceeded through the intersection before instructing the autonomous vehicle to proceed through the intersection. However, in situations where obstructions are preventing a previously-arrived vehicle from proceeding through the intersection, the intersection decision system may depart from the "first-in first-out" implementation. The intersection decision system may instead instruct the autonomous vehicle to proceed through the intersection without waiting for the previously-arrived vehicle.

In illustrative embodiments, the intersection decision system detects obstructions in the form of pedestrians crossing the intersection in front of previously-arrived vehicles. The intersection decision system may estimate a duration of time for which a previously-arrived vehicle will be obstructed by a pedestrian. The intersection decision system may also estimate how long it will take the autonomous vehicle to traverse the intersection. If the estimated obstruction time is greater than the estimated traversal time, the intersection decision system may instruct the autonomous vehicle to proceed through the intersection without waiting for the previously-arrived vehicle. On the other hand, if the estimated obstruction time is less than the estimated traversal time, the intersection decision system may wait to detect that the previously-arrived vehicle has proceeded through the intersection before instructing the autonomous vehicle to proceed through the intersection.

Additional features of the present disclosure will become apparent to those skilled in the art upon consideration of illustrative embodiments exemplifying the best mode of carrying out the disclosure as presently perceived.

BRIEF DESCRIPTION OF THE FIGURES

The detailed description particularly refers to the accompanying figures in which:

FIG. 1A is a plan view of a stop sign intersection suggesting that the intersection decision system has detected a previously-arrived vehicle at the stop sign intersection, has detected that the path of the previously-arrived vehicle is not obstructed, and in response waits for the previously-arrived vehicle to proceed through the stop sign intersection before instructing the autonomous vehicle to proceed through the stop sign intersection;

FIG. 1B is a plan view of the stop sign intersection of FIG. 1A suggesting that the intersection decision system has detected that the path of the previously-arrived vehicle is obstructed by a pedestrian and that, in response, the intersection decision system instructs the autonomous vehicle to traverse the stop sign intersection without waiting for the previously-arrived vehicle to traverse the stop sign intersection;

DETAILED DESCRIPTION

Figure 1A:
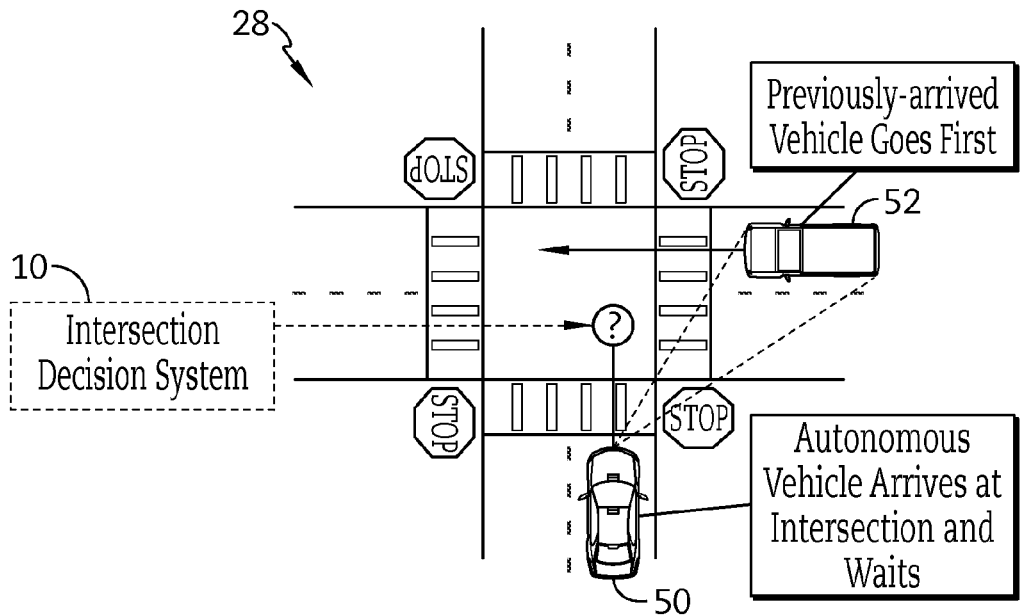
FIGS. 1A and 1B are a series of plan views of a stop sign intersection illustrating exemplary scenarios in which an intersection decision system in accordance with the present disclosure instructs an autonomous vehicle as to when the autonomous vehicle should traverse the stop sign intersection.
Figure 1B:
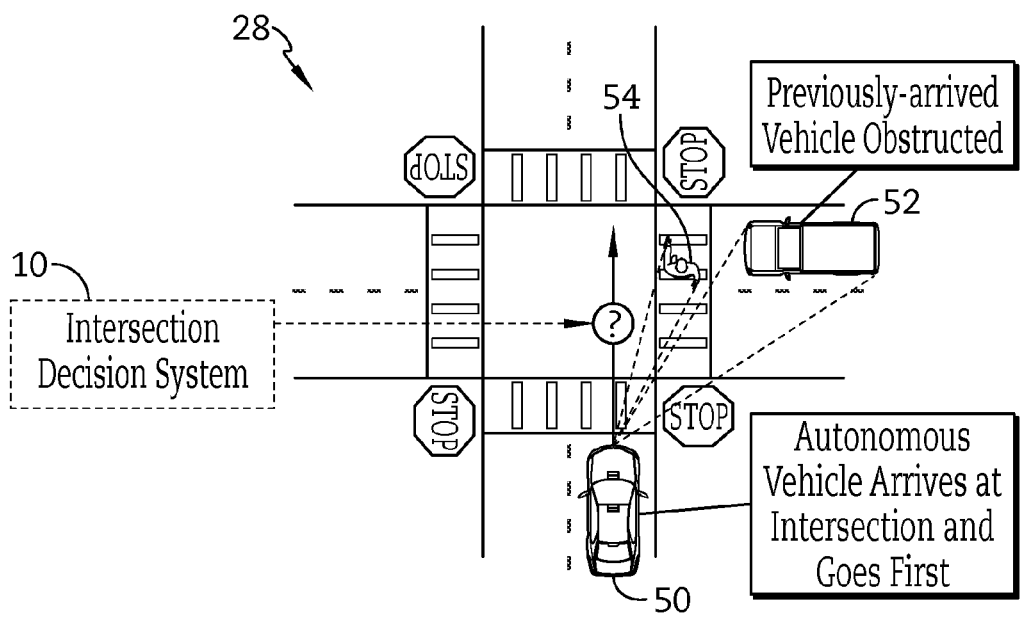

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

An intersection decision system 10 that performs an intersection decision process 11 is shown in FIGS. 1A-4. Intersection decision system 10 includes computer code that can be loaded onto an in-vehicle processor for execution to automatically determine when an autonomous vehicle 50 should proceed through a stop sign intersection 28. Intersection decision system 10 automatically detects arrival of autonomous vehicle 50 at stop sign intersection 28, automatically detects previously-arrived vehicle 52 that has already arrived at stop sign intersection 28, and detects obstructions such as pedestrian 54 that may block the path of previously-arrived vehicle 52, as suggested in FIGS. 1A-B. Intersection decision system 10 factors the obstruction caused by pedestrian 54 in determining when, in relative sequence to previously-arrived vehicle 52, autonomous vehicle 50 should proceed through stop sign intersection 28.

For example, when previously-arrived vehicle 52 is not obstructed, as suggested in FIG. 1A, intersection decision system 10 may determine that vehicles should proceed through stop sign intersection 28 according to a "first-in, first-out" principle. Intersection decision system 10 may wait to detect that previously-arrived vehicle 52 has proceeded through stop sign intersection 28 before instructing autonomous vehicle 50 to proceed through stop sign intersection 28. However, where previously-arrived vehicle 52 is obstructed by pedestrian 54, as suggested in FIG. 1B, intersection decision system 10 may deviate from the "first-in, first-out" principle. Intersection decision system 10 may instruct autonomous vehicle 50 to proceed through stop sign intersection 28 without waiting for previously-arrived vehicle 52 to proceed through stop sign intersection 28.

Intersection decision systems in accordance with the present disclosure provide a technical solution to the problem of efficiently navigating autonomous vehicles through stop sign intersections. Conventional autonomous vehicles may make autonomous driving decisions by applying typical driving rules to existing roadway conditions. In the context of navigating through intersections, such systems may detect and analyze the type of intersection at hand, detect and analyze the arrangement of other vehicles at the intersection, and apply programmatic logic that follows typical rules governing rights of way at such intersections based on the detected arrangement of other vehicles. However, autonomous driving systems in accordance with the present disclosure can operate with improved artificial intelligence by also taking into account extrinsic factors that impact driving patterns on the roadway. Such extrinsic factors include pedestrians crossing intersections. By taking into account extrinsic factors, autonomous driving systems in accordance with the present disclosure provide enhanced efficiency, improved drive times, and a more natural feel to the autonomous driving experience for passengers.

Figure 2:
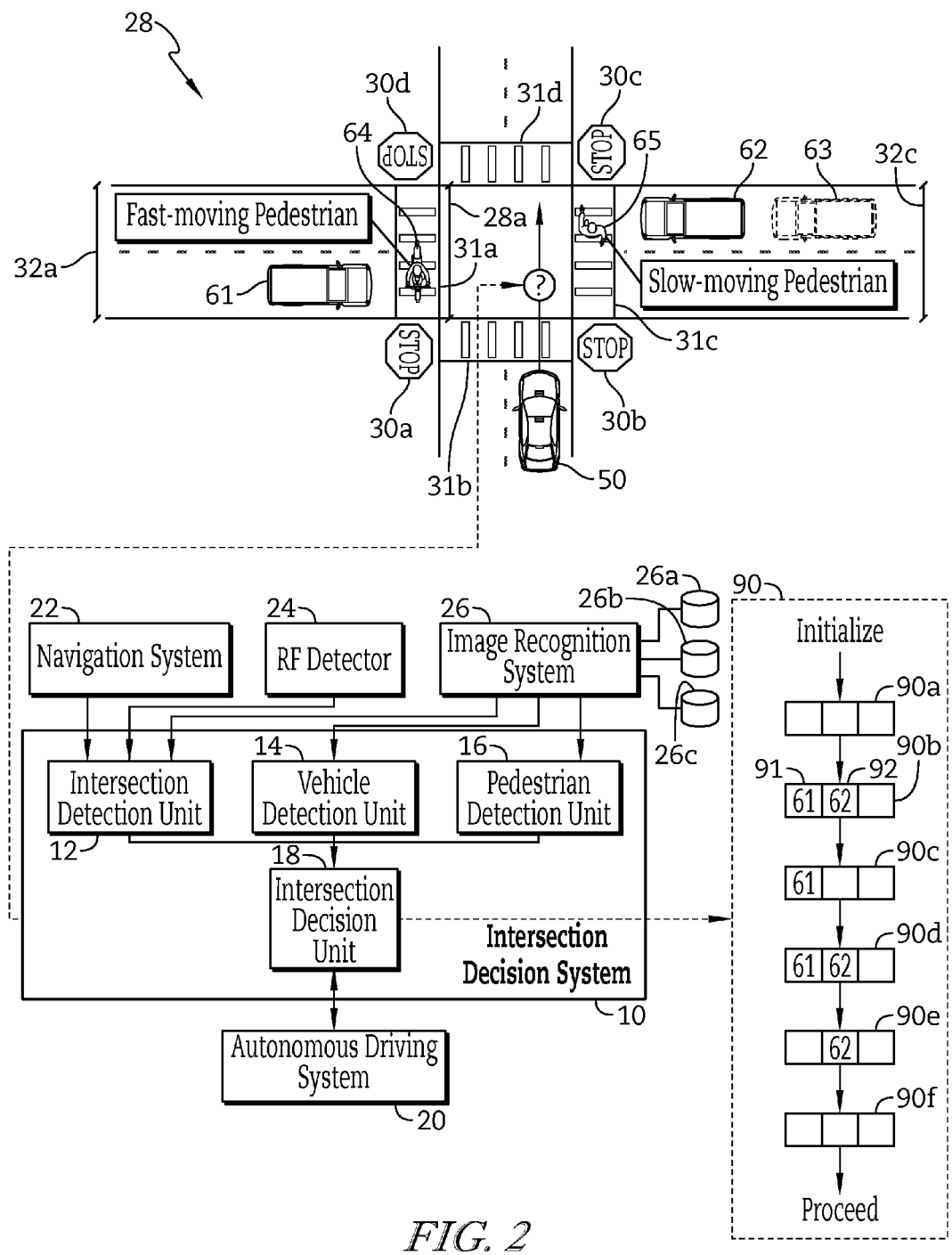
FIG. 2 is a diagrammatic view of the intersection decision system showing that the intersection decision system includes an intersection detection unit for detecting stop sign intersections, a vehicle detection unit for detecting previously-arrived vehicles at intersections, a pedestrian detection unit for detecting pedestrians at intersections, and an intersection decision unit for determining when the autonomous vehicle should proceed through the intersection, and shows a plan view of a stop sign intersection showing an exemplary usage scenario of the intersection decision system in accordance with the present disclosure.

In more detail, with reference to FIG. 2, intersection decision system 10 includes intersection detection unit 12 for detecting stop sign intersection 28, vehicle detection unit 14 for detecting previously-arrived vehicles 61, 62, and pedestrian detection unit 16 for detecting pedestrians 64, 65. Intersection decision system 10 also includes intersection decision unit 18 which performs intersection decision process 11, shown in FIG. 3, to decide when autonomous vehicle 50 should proceed through stop sign intersection 28. Autonomous vehicle 50 also includes an autonomous driving system 20 that autonomously navigates autonomous vehicle 50. When autonomous vehicle 50 is located at stop sign intersections, autonomous vehicle 50 awaits instructions from intersection decision unit 18 on when to proceed.

Intersection detection unit 12 detects when autonomous vehicle 50 arrives at stop sign intersection 28. Generally, a stop sign intersection is an intersection where right of way is governed at least in part by one or more stop signs. In illustrative embodiments, intersection detection unit 12 detects arrival of autonomous vehicle 50 at stop sign intersection 28 using one or more of a navigation system 22, a radio frequency ("RF") detector 24, and/or an image recognition system 26. Navigation system 22, radio frequency ("RF") detector 24, and image recognition system 26 are communicatively coupled to intersection detection unit 12.

Navigation system 22 may include geolocation tracking capabilities, such as Global Positioning System ("GPS") tracking. Navigation system 22 may also be pre-programmed with geolocations of stop sign intersections. When autonomous vehicle 50 arrives at stop sign intersection 28, navigation system 22 may compare geolocation coordinates of autonomous vehicle 50 with pre-programmed geolocation coordinates of known stop sign intersections and conclude that autonomous vehicle 50 has arrived at stop sign intersection 28. Navigation system 22 may notify intersection detection unit 12, which in response detects that autonomous vehicle 50 has arrived at stop sign intersection 28.

RF detector 24 may be capable of detecting RF signals indicating that autonomous vehicle 50 is approaching stop sign intersection 28. Stop sign intersection 28 may include a radio frequency emitter disposed in stop signs 30a-d or another suitable structure that transmits radio frequency signals according to a predetermined pattern of radio frequency signal waveforms. The predetermined pattern of radio frequency signal waveforms conveys to nearby vehicles that a stop sign intersection is approaching. RF detector 24 may detect and process the radio frequency signals as to recognize the predetermined pattern of radio frequency signal waveforms. In response to recognizing the predetermined pattern, RF detector 24 may notify intersection detection unit 12, which detects that autonomous vehicle 50 has arrived at stop sign intersection 28.

Image recognition system 26 may be capable of capturing image data of vehicle surroundings and detecting features characteristic of stop sign intersections, such as stop signs 30a-d. For example, image recognition system 26 may include cameras that obtain image data of stop sign intersection 28. Image recognition system 26 may recognize stop signs 30a-d within frames of image data using any suitable object detection, recognition, and classification methodology. For example, image recognition system 26 may include a road sign database 26a that includes training data in the form of images known to contain various types of road signage (e.g., stop signs, exit signs, traffic lights, yield signs, etc.) and images known not to contain road signage. The training data can be used to generate a statistical classification algorithm that classifies a given sample of image data based on whether that sample is likely to include a road sign and, if so, what type of road sign.

Image recognition system 26 may then perform pixel-based segmentation of captured frames of image data to apply subwindowing schemes, such as sliding window detection, to the captured frames of image data in order to identify candidate subwindows that may contain images of road signs. For each candidate subwindow, the image recognition system 26 may apply the statistical classification algorithm to form a prediction on whether the subwindow contains a road sign and, if so, the type of road sign contained in the subwindow.

In illustrative embodiments, image recognition system 26 may also use optical character recognition ("OCR") techniques to recognize the word "STOP" on stop signs 30a-d and thereby detect stop signs 30a-d.

In sum, image recognition system 26 can detect stop signs 30a-d in captured frames of image data. In response to detecting stop signs 30a-d, image recognition system 26 may notify intersection detection unit 12, which thereby detects that autonomous vehicle 50 has arrived at stop sign intersection 28.

After intersection detection unit 12 detects that autonomous vehicle 50 has arrived at stop sign intersection 28, vehicle detection unit 14 may detect previously-arrived vehicles 61, 62 that have already arrived at stop sign intersection 28. Vehicle detection unit 14 may detect previously-arrived vehicles 61, 62 using image recognition system 26. Similar to detection of stop signs 30a-c, image recognition system 26 may obtain image data of stop sign intersection 28 from a camera and recognize previously-arrived vehicles 61, 62 within frames of image data using any suitable object detection, recognition, and classification methodology. For example, image recognition system 26 may include a vehicle database 26b that includes training data in the form of images known to contain vehicles and images known not to contain vehicles. The training data can be used to generate a statistical classification algorithm that classifies a given sample of image data based on whether that sample is likely to include a vehicle.

Image recognition system 26 may then perform pixel-based segmentation of captured frames of image data to apply subwindowing schemes, such as sliding window detection, to the captured frames of image data in order to identify candidate subwindows that may contain vehicles. For each candidate subwindow, the image recognition system 26 may apply the statistical classification algorithm to form a prediction on whether the subwindow contains a vehicle.

Image recognition system 26 may notify vehicle detection unit 14 of detected previously-arrived vehicles 61, 62. In illustrative embodiments, image recognition system 26 may detect but filter out other vehicles proximal to stop sign intersection 28 but that have not yet arrived at stop sign intersection 28. In the illustrative example of FIG. 2, vehicle 63 is proximal to stop sign intersection 28 but is waiting for previously-arrived vehicle 62 to traverse stop sign intersection 28 before vehicle 63 can advance and arrive at stop sign intersection 28. Image recognition system 26 may detect vehicle 63 but filter it out prior to notifying vehicle detection unit 14.

Image recognition system 26 may also notify vehicle detection unit 14 of the location of previously-arrived vehicles 61, 62. For example, image recognition system 26 may notify vehicle detection unit 14 that previously-arrived vehicle 61 is at stop sign intersection 28 behind cross-walk 31a and previously-arrived vehicle 62 is at stop sign intersection 28 behind cross-walk 31c.

After vehicle detection unit 14 detects previously-arrived vehicles 61, 62, pedestrian detection unit 16 detects pedestrians that may block the path of previously-arrived vehicles 61, 62. Pedestrian detection unit 16 may detect pedestrians using image recognition system 26 through similar techniques used for detection of stop signs 30a-d and previously-arrived vehicles 61, 62. In illustrative embodiments, image recognition system 26 first detects cross-walks 31a, 31c near the locations of previously-arrived vehicles 61, 62. Where cross-walks 31a, 31c are delineated using white painted lines, the pixel intensity for portions of the image data corresponding to cross-walks 31a, 31c may sharply differ from the pixel intensity of other portions of the image data. Such differences give rise to discontinuities, near-discontinuities, or sharp gradients in pixel intensity at locations in the image data corresponding to cross-walks 31a, c. This allows image recognition system 26 to identify cross-walks 31a, c through techniques such as edge-detection, ridge-detection, or other feature extraction and identification methodologies.

After identifying cross-walks 31a, 31c, image recognition system 26 may analyze image data of the region surrounding cross-walks 31a, 31c to identify pedestrians 64, 65. Image recognition system 26 may detect pedestrians 64, 65 using any suitable object detection, recognition, and classification methodology. For example, image recognition system 26 may include a pedestrian database 26c that includes training data in the form of images known to contain pedestrians of predetermined types (e.g., pedestrians on foot, on bicycles, pushing strollers, walking pets, etc.) as well as images known not to contain pedestrians. The training data can be used to generate a statistical classification algorithm that classifies a given sample of image data based on whether that sample is likely to include a pedestrian and, if so, what type of pedestrian (e.g., pedestrians on foot, on bicycles, pushing strollers, walking pets, etc.). Image recognition system 26 may then apply the statistical classification algorithm to form a prediction on whether the captured image data near cross-walks 31a, 31c contains a pedestrian and, if so, the type of pedestrian.

In this illustrative example, image recognition system 26 detects pedestrian 64 riding on a bicycle along cross-walk 31a in front of previously-arrived vehicle 61 and pedestrian 65 walking along cross-walk 31c in front of previously-arrived vehicle 62. Other types of obstructions, such as other moving or stationary objects or animals are within the scope of the present disclosure.

Figure 3:
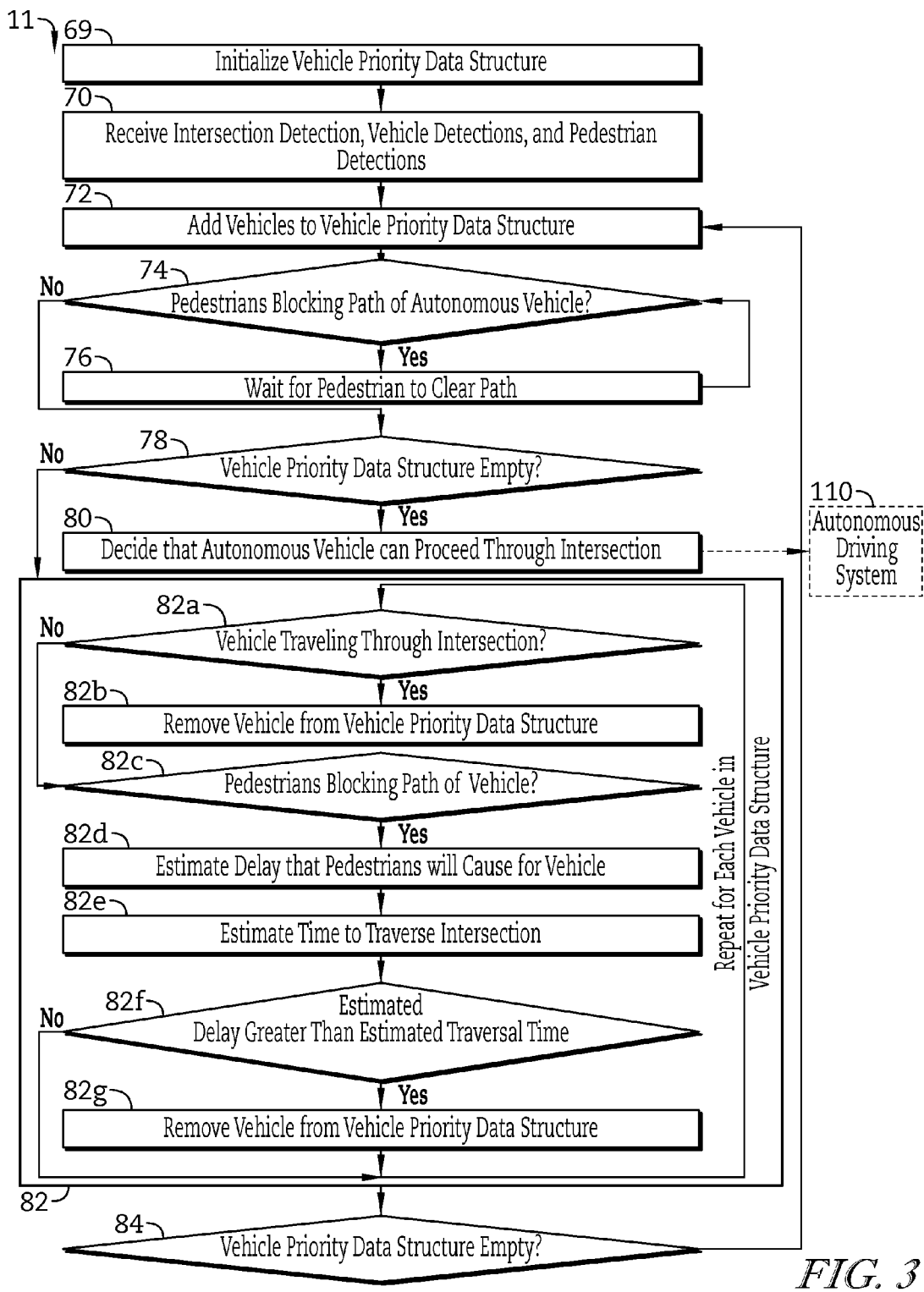
FIG. 3 is a flow diagram of an intersection decision process implemented by the intersection decision unit of FIG. 2 in accordance with the present disclosure showing that the intersection decision process maintains an in-memory data structure that identifies previously-arrived vehicles having a "right of way" to proceed through the intersection and showing steps for adding or removing previously-arrived vehicles from the in-memory data structure based in part on whether the previously-arrived vehicles are obstructed from proceeding through the stop sign intersection.

After detection of stop sign intersection 28, previously-arrived vehicles 61, 62, and pedestrians 64, 65, intersection decision unit 18 performs intersection decision process 11, shown in FIG. 3. Intersection decision process 11 analyzes stop sign intersection 28, including detected vehicles and pedestrians, to arrive at a decision on when autonomous vehicle 50 should proceed through stop sign intersection 28.

Intersection decision process 11 begins with initializing operation 69, which initializes an instance 90a of an in-memory vehicle priority data structure 90, shown in FIG. 2. As will be explained, intersection decision unit 18 uses vehicle priority data structure 90 to track which vehicles should proceed through stop sign intersection 28 prior to autonomous vehicle 50 proceeding through stop sign intersection 28. Vehicle priority data structure 90 may be implemented as any data structure suitable for storing elements of data, such as arrays, queues, linked lists, etc. After initialization, vehicle priority data structure 90 is empty, as suggested by instance 90a.

Intersection decision process 11 proceeds to receiving operation 70, in which intersection decision unit 18 receives detections of stop sign intersection 28, previously-arrived vehicles 61, 62, and pedestrians 64, 65, as explained above. Intersection decision process 11 then proceeds to adding operation 72, in which intersection decision unit 18 adds identifiers for previously-arrived vehicles 61, 62 to vehicle priority data structure 90. Instance 90b of vehicle priority data structure 90 suggests the state of vehicle priority data structure 90 subsequent to adding operation 72. Instance 90b includes entry 91 corresponding to previously-arrived vehicle 61 and entry 92 corresponding to previously-arrived vehicle 62. Entry 91 and entry 92 may include an identification of previously-arrived vehicles 61, 62, as well as other information pertaining to previously-arrived vehicles 61, 62, such as locations of previously-arrived vehicles 61, 62.

Intersection decision process 11 then proceeds to determining operation 74, in which intersection decision unit 18 determines whether pedestrians are blocking the path of autonomous vehicle 50. If so, intersection decision process 11 determines that autonomous vehicle 50 should not proceed through stop sign intersection 28 and instead waits in waiting operation 76. After waiting for a predetermined period of time, intersection decision process 11 returns to determining operation 74 to determine whether the pedestrians have cleared the path of autonomous vehicle 50. In the illustrative example of FIG. 2, cross-walk 31b in front of autonomous vehicle 50 is clear of pedestrians, so intersection decision process 11 proceeds to determining operation 78.

In determining operation 78, intersection decision unit 18 determines whether instance 90b of vehicle priority data structure 90 is empty. If instance 90b is empty, intersection decision unit 18 concludes there are no vehicles that have priority to cross stop sign intersection 28 ahead of autonomous vehicle 50. Accordingly, intersection decision unit 18 proceeds to deciding operation 80, in which intersection decision unit 18 decides that autonomous vehicle 50 can proceed through stop sign intersection 28. Intersection decision unit 18 instructs autonomous driving system 20 that it can proceed through stop sign intersection 28, in response to which autonomous driving system 20 navigates autonomous vehicle 50 through stop sign intersection 28.

In the illustrative example of FIG. 2, however, instance 90b of vehicle priority data structure 90 is not empty, meaning there may be other vehicles at stop sign intersection 28 having priority over autonomous vehicle 50 (in this case, previously-arrived vehicles 61, 62). Intersection decision process 11 proceeds to iterative loop 82, which includes operations by which intersection decision unit 18 evaluates each previously-arrived vehicle 61, 62. Thus, iterative loop 82 includes operations 82a-g that are performed for each entry of vehicle priority data structure 90.

Iterative loop 82 begins with determining operation 82a, in which intersection decision unit 18 determines whether previously-arrived vehicles 61, 62 are in the process of travelling, or have already travelled, through stop sign intersection 28. If so, previously-arrived vehicles 61, 62 will have already proceeded through stop sign intersection 28, meaning autonomous vehicle 50 would no longer have to wait for previously-arrived vehicles 61, 62. In response, in operation 82b, previously-arrived vehicles 61, 62 would be removed from vehicle priority data structure 90.

In the illustrative example of FIG. 2, however, previously-arrived vehicles 61, 62 remain at stop sign intersection 28, meaning intersection decision process 11 instead proceeds to determining operation 82c. In determining operation 82c, intersection decision unit 18 determines whether any pedestrians 64, 65 are obstructing the path of previously-arrived vehicles 61, 62. If so, intersection decision process 11 proceeds to estimating operation 82d, in which intersection decision unit 18 estimates the duration of time for which pedestrians 64, 65 will obstruct the path of previously-arrived vehicles 61, 62.

To estimate the duration of time, image recognition system 26 may track the location of detected pedestrians 64, 65 over time using object tracking techniques (e.g., Kalman filtering) and communicate the relative location of pedestrians 64, 65 over time to intersection decision unit 18. By factoring the relative location of pedestrians 64, 65 over time and lengths 32a, 32c of cross-walks 31a, 31c, intersection decision unit 18 can estimate a duration of time for which pedestrians 64, 65 are likely to obstruct previously-arrived vehicles 61, 62.

In the illustrative example of FIG. 2, pedestrian 64 is on a bicycle and moving at a fast rate, meaning pedestrian 64 may obstruct previously-arrived vehicle 61 for a relatively short duration of time. Pedestrian 65, however, is on foot and moving slowly, meaning pedestrian 65 may obstruct previously-arrived vehicle 62 for a longer duration of time.

Intersection decision process 11 then proceeds to estimating operation 82e, in which intersection decision unit 18 estimates how long it will take autonomous vehicle 50 to traverse stop sign intersection 28. For example, intersection decision unit 18 may estimate a length 28a of stop sign intersection 28 based on a detected length of cross-walk 31a next to autonomous vehicle 50. By also factoring the anticipated speed of autonomous vehicle 50 through stop sign intersection 28, intersection decision unit 18 can estimate a duration of time that it will take for autonomous vehicle 50 to traverse stop sign intersection 28.

Intersection decision process 11 then proceeds to comparing operation 82f, in which intersection decision unit 18 compares the estimated obstruction time computed in operation 82d with the estimated traversal time computed in operation 82e. If the estimated obstruction time is greater than the estimated traversal time, intersection decision unit 18 concludes that autonomous vehicle 50 will be able to traverse stop sign intersection 28 before the obstruction clears. If the estimated obstruction time is less than the estimated traversal time, intersection decision unit 18 concludes that autonomous vehicle 50 will not be able to traverse stop sign intersection 28 before the obstruction clears.

In the illustrative example of FIG. 2, because pedestrian 65 is slow-moving, intersection decision unit 18 concludes that autonomous vehicle 50 will be able to traverse stop sign intersection 28 before pedestrian 65 is clear from the path of previously-arrived vehicle 62. In this situation, intersection decision process 11 proceeds to removing operation 82g, in which previously-arrived vehicle 62 is removed from vehicle priority data structure 90, as suggested in instance 90c of vehicle priority data structure 90.

Because pedestrian 64 is fast-moving, intersection decision unit 18 concludes that autonomous vehicle 50 will not be able to traverse stop sign intersection 28 by the time pedestrian 64 is clear from the path of previously-arrived vehicle 61. Thus, previously-arrived vehicle 61 may remain in vehicle priority data structure 90, as suggested in instance 90c.

Intersection decision process 11 then proceeds to determining operation 84, in which intersection decision unit 18 again determines whether vehicle priority data structure 90 is empty. If vehicle priority data structure 90 is empty, then intersection decision unit 18 concludes that any previously-arrived vehicles 61, 62 having priority over autonomous vehicle 50 are sufficiently obstructed such that autonomous vehicle 50 can proceed. Accordingly, intersection decision unit 18 proceeds to deciding operation 80, in which intersection decision unit 18 decides that autonomous vehicle 50 can proceed through stop sign intersection 28. Intersection decision unit 18 instructs autonomous driving system 20 that it can proceed through stop sign intersection 28, in response to which autonomous driving system 20 navigates autonomous vehicle 50 through stop sign intersection 28.

In this illustrative example, however, vehicle priority data structure 90 is not empty, as suggested in instance 90c, because it contains an entry corresponding to previously-arrived vehicle 61. As such, intersection decision unit 18 concludes there is a likelihood that previously-arrived vehicle 61 may soon be obstruction-free such that autonomous vehicle 50 should wait for previously-arrived vehicle 61. Intersection decision unit 18 therefore returns to determining operation 72 for an additional iteration of processing.

As intersection decision process 11 iterates through operations 72-82, vehicle priority data structure 90 will ultimately become empty, at which time intersection decision unit 18 will instruct autonomous vehicle 50 to proceed through stop sign intersection 28. For example, during a second iteration of operations 72-82, previously-arrived vehicles 61, 62 may again be added to vehicle priority data structure 90, as suggested in instance 90d shown in FIG. 2. By such time, fast-moving pedestrian 64 may have cleared the path of previously-arrived vehicle 61, and previously-arrived vehicle 61 may have already proceeded through stop sign intersection 28. As a result, removing operation 82b will result in previously-arrived vehicle 61 being removed from vehicle priority data structure 90, as suggested by instance 90e.

Meanwhile, slow-moving pedestrian 65 may continue to obstruct previously-arrived vehicle 62, meaning previously-arrived vehicle 62 will again be removed in removing operation 82g, as suggested by instance 90f. As a result, when intersection decision process 11 arrives at determining operation 84, vehicle priority data structure 90 will be empty. Intersection decision unit 18 concludes there are no unobstructed vehicles that have priority ahead of autonomous vehicle 50. Accordingly, intersection decision process 11 proceeds to deciding operation 80, in which intersection decision unit 18 decides that autonomous vehicle 50 can proceed through stop sign intersection 28. Intersection decision unit 18 instructs autonomous driving system 20 that it can proceed through stop sign intersection 28, in response to which autonomous driving system 20 navigates autonomous vehicle 50 through stop sign intersection 28.

Figure 4:
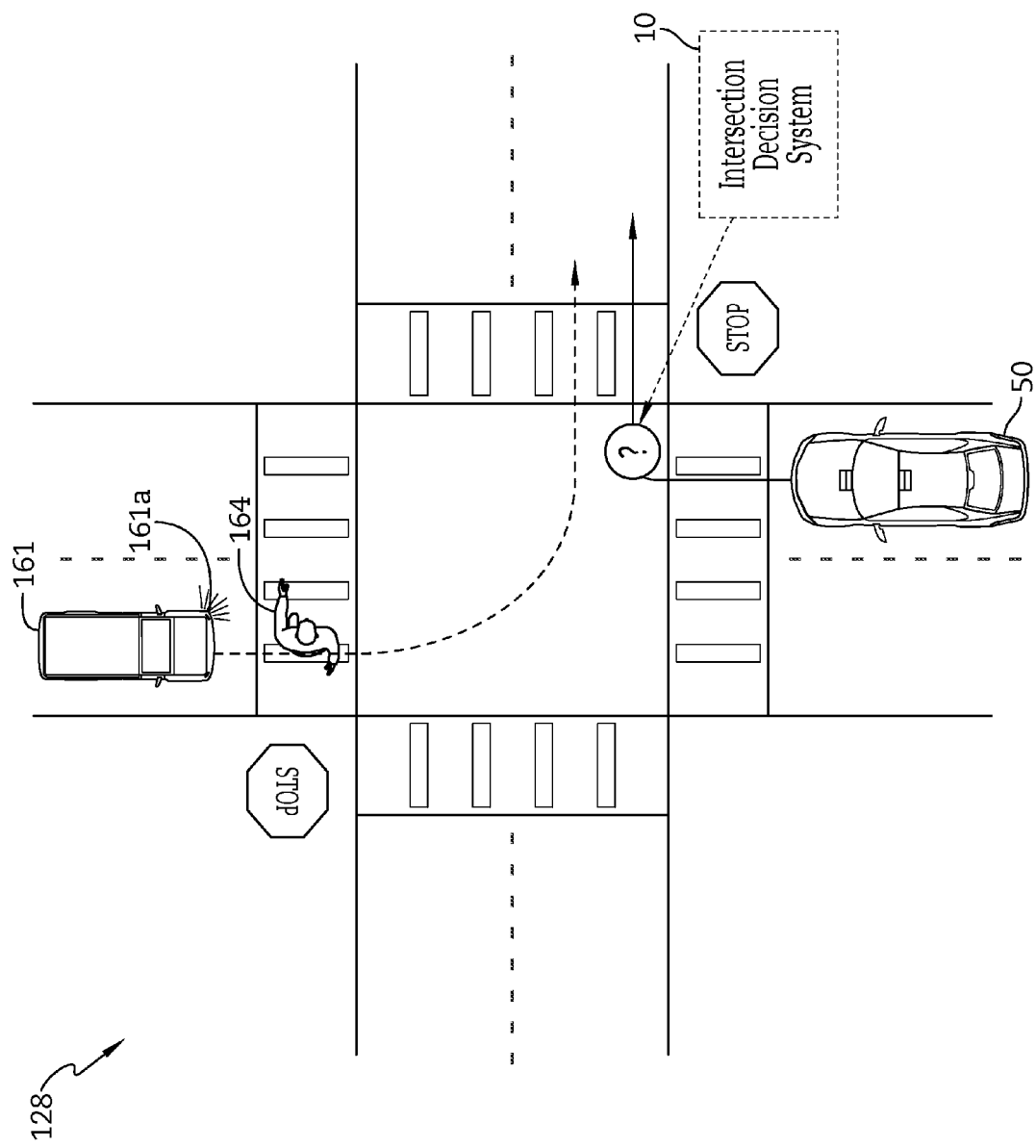
FIG. 4 is a plan view of a stop sign intersection showing an exemplary usage scenario in which the intersection decision system of FIG. 1 is used at a two-way stop sign intersection.

Although FIGS. 1-3 illustrate use of intersection decision system 10 in connection with an exemplary four-way stop sign intersection 28, other types of stop sign intersections are within the scope of the present disclosure. For example, FIG. 4 shows an exemplary two-way stop sign intersection 128. In this example, autonomous vehicle 50 equipped with intersection decision system 10 arrives at intersection 128 in anticipation of making a right turn. A previously-arrived vehicle 161 has already arrived at intersection 128 opposite autonomous vehicle 50, awaiting to take a left turn. In this example, previously-arrived vehicle 161 is obstructed by a slow-moving pedestrian 164.

Intersection decision system 10 detects that previously-arrived vehicle 161 plans to take a left turn—e.g., by detecting left-turn signal 161a. In the absence of pedestrian 164, intersection decision unit 18 would conclude that previously-arrived vehicle 161 has priority over autonomous vehicle 50 and allow previously-arrived vehicle 161 to traverse intersection 128 before instructing autonomous vehicle 50 to proceed. However, intersection decision unit 18 detects that slow-moving pedestrian 164 will obstruct previously-arrived vehicle 161 for a duration of time longer than the time it would take autonomous vehicle 50 to execute a right turn. Accordingly, intersection decision unit 18 instructs autonomous vehicle 50 to execute a right turn without waiting for previously-arrived vehicle 161.

The above-described components, including intersection detection unit 12, vehicle detection unit 14, pedestrian detection unit 16, intersection decision unit 18, and autonomous driving system 20, may be implemented in software, compiled and stored to a memory as object code, and during operation of the vehicle, may be invoked for execution by one or more processors. In one implementation, the above-described components are implemented as a single system on a chip. The interconnections among the above-described components can be provided through any suitable electronic communication mechanism, such as a communication bus. Thus, intersection decision system 10 may be implemented as software complied into object code on one or more memories that, during runtime, are invoked for execution by one or more processors. Intersection decision system 10 may be provided as part of or along with autonomous driving system 20 such that both systems are provided in a common chip package. Where intersection decision system 10 is provided in a separate hardware module from autonomous driving system 20, they may communicate with one another through any suitable electronic communication mechanism, such as a communication bus. Databases 26a-c may be implemented in a database using any known database environment, such as Oracle, DB2, or SQL Server.

Although certain embodiments have been described and illustrated in exemplary forms with a certain degree of particularity, it is noted that the description and illustrations have been made by way of example only. Numerous changes in the details of construction, combination, and arrangement of parts and operations may be made. Accordingly, such changes are intended to be included within the scope of the disclosure, the protected scope of which is defined by the claims.

The invention claimed is:

1. An in-vehicle system for autonomously navigating an autonomous vehicle through a stop sign intersection, comprising:
   an intersection arrival detector configured to detect that the vehicle has arrived at the stop sign intersection;
   a vehicle detector configured to detect a previously-arrived vehicle at the stop sign intersection;
   a pedestrian detector configured to detect a pedestrian crossing at the stop sign intersection; and
   means for determining that the detected pedestrian is obstructing the previously-arrived vehicle from proceeding through the stop sign intersection and for deciding, in response to the determination, instructs the autonomous vehicle to proceed through the stop sign intersection without waiting for the previously-arrived vehicle to proceed through the stop sign intersection,
   wherein the means for determining that the detected pedestrian is obstructing the previously-arrived vehicle comprises a calculator that estimates a duration of time for which the detected pedestrian will obstruct the previously-arrived vehicle.

2. The in-vehicle system of claim 1, wherein
   the intersection arrival detector is one of a navigation system configured to detect when the vehicle is in a geographic proximity of the stop sign intersection, an image recognition system configured to recognize distinguishing characteristics of stop signs, and a radio frequency detector configured to recognize radio frequency signals characteristic of stop sign intersections emitted from a locale of the stop sign intersection.

3. An in-vehicle system for autonomously navigating an autonomous vehicle through a stop sign intersection, comprising:
   an intersection arrival detector configured to detect that the vehicle has arrived at the stop sign intersection;

a vehicle detector configured to detect previously-arrived vehicles at the stop sign intersection;

an obstruction detector configured to detect obstructions that prevent one or more of the previously arrived vehicles from proceeding through the stop sign intersection; and a processor and a non-transitory data storage on which is stored computer code which, when executed on the processor, causes the system to:

identify obstructed vehicles among the previously-arrived vehicles;

determine that the autonomous vehicle can proceed through the stop sign intersection before the obstructed vehicles, and instruct the autonomous vehicle to proceed through the stop sign intersection.

4. The in-vehicle system of claim 3, wherein the computer code, when executed on the processor, causes the system to:

store on the non-transitory data storage an identification of the previously-arrived vehicles;

when no obstructions to the previously-arrived vehicles are detected, operate in a first mode; and when obstructions to the previously-arrived vehicles are detected, operate in a second mode; wherein in the first mode, the computer code, when executed, causes the system to wait for each of the previously-arrived vehicles to proceed through the stop sign intersection before instructing the autonomous vehicle to proceed through the stop sign intersection; and in the second mode, the computer code, when executed, causes the system to proceed through the stop sign intersection without waiting for the previously-arrived vehicles.

5. The in-vehicle system of claim 3, wherein the intersection arrival detector is one of a navigation system configured to detect when the vehicle is in a geographic proximity of the stop sign intersection, an image recognition system configured to recognize distinguishing characteristics of stop signs, and a radio frequency detector configured to recognize radio frequency signals characteristic of stop sign intersections emitted from a locale of the stop sign intersection.

6. The in-vehicle system of claim 3, wherein the computer code, when executed on the processor, causes the system to:

estimate a first duration of time for which a detected obstruction will obstruct one of the previously-arrived vehicles;

estimate a second duration of time required for the autonomous vehicle to proceed through the stop sign intersection;

compare the first estimated duration and the second estimated duration; and instruct the autonomous vehicle to proceed through the intersection in response to a determination that the first estimated duration is greater than the second estimated duration.

7. The in-vehicle system of claim 3, wherein the obstruction detector is configured to detect pedestrians.

8. A method for automatically navigating an autonomous vehicle through a stop sign intersection, comprising:

detecting arrival of the autonomous vehicle at a stop sign intersection;

detecting previously-arrived vehicles at the stop sign intersection;

detecting obstructions that prevent one or more of the previously arrived vehicles from proceeding through the stop sign intersection;

identifying obstructed vehicles among the previously-arrived vehicles; and determining that the autonomous vehicle can proceed through the stop sign intersection before the obstructed vehicles, in response to which an autonomous driving system of the autonomous vehicle navigates the autonomous vehicle through the stop sign intersection.

9. The method of claim 8, comprising:

when no obstructions to the previously-arrived vehicles are detected, waiting to detect that each of the previously-arrived vehicles has proceeded through the stop sign intersection before instructing the autonomous vehicle to proceed through the stop sign intersection; and when obstructions to the previously-arrived vehicles are detected, instructing the autonomous vehicle to proceed through the stop sign intersection without waiting for detections that the obstructed previously-arrived vehicles have proceeded through the stop sign intersection.

10. The method of claim 8, further comprising:

estimating a first duration of time for which a detected obstruction will obstruct one of the previously-arrived vehicles;

estimating a second duration of time required for the autonomous vehicle to proceed through the stop sign intersection;

comparing the first estimated duration and the second estimated duration; and instructing the autonomous vehicle to proceed through the intersection in response to a determination that the first estimated duration is greater than the second estimated duration.

11. The method of claim 8, comprising detecting pedestrians.

* * * * *